United States Patent
Cohen et al.

(12) United States Patent
(10) Patent No.: US 6,765,582 B1
(45) Date of Patent: Jul. 20, 2004

(54) HYBRID PROCEDURAL/PIXEL BASED TEXTURES

(75) Inventors: Aaron M. Cohen, Beaverton, OR (US); Christopher L. Gorman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/439,642

(22) Filed: Nov. 12, 1999

(51) Int. Cl.[7] ............................................... G09G 5/00
(52) U.S. Cl. ........................................................ 345/582
(58) Field of Search ................................. 345/552, 582

(56) References Cited

U.S. PATENT DOCUMENTS

| | | | |
|---|---|---|---|
| 5,481,669 A | | 1/1996 | Poulton et al. |
| 5,808,617 A | | 9/1998 | Kenworthy et al. |
| 5,852,443 A | | 12/1998 | Kenworthy |
| 5,949,428 A | | 9/1999 | Toelle et al. |
| 5,956,043 A | | 9/1999 | Jensen |
| 6,111,582 A | * | 8/2000 | Jenkins ........................ 345/421 |
| 6,157,743 A | * | 12/2000 | Goris et al. |
| 6,172,613 B1 | * | 1/2001 | DeLine et al. |
| 6,239,807 B1 | * | 5/2001 | Bossut |
| 6,275,235 B1 | * | 8/2001 | Morgan, III ................. 345/430 |
| 6,289,382 B1 | * | 9/2001 | Bowman-Amuah ......... 709/226 |

OTHER PUBLICATIONS

*Texturing & Modeling*, Second Edition, A Procedural Approach, David S. Ebert, et al., 1998, Chapter 1 (Introduction) and Chapter 2 (Building Procedural Textures).

* cited by examiner

*Primary Examiner*—Mark Zimmerman
*Assistant Examiner*—Scott Wallace
(74) *Attorney, Agent, or Firm*—Blakely, Sokoloff, Taylor & Zafman LLP

(57) ABSTRACT

Apparatus and method of providing textured surfaces for computer-generated images comprises embedding a procedural description corresponding to a bit-map representation of a texture in a hybrid file module that also includes the bit-map representation. The hybrid file module may be transmitted to a player over a data communications medium. Once received, the player extracts the procedural description from the hybrid file module, with the procedural description then being used to render the texture.

27 Claims, 2 Drawing Sheets

HYBRID PROCEDURAL/PIXEL BASED TEXTURES

FIELD OF THE INVENTION

The present invention relates generally to the field of computer graphics. More specifically, to graphics rendering systems and methods for creating realistic three-dimensional (3-D) graphical representations.

BACKGROUND OF THE INVENTION

The use of procedural techniques for three-dimensional texturing (solid texturing), modeling, and shading in computer graphics and animation has grown rapidly over the past decade. It is now possible for three-dimensional objects and shapes created on a personal computer or workstation to be filled in with textures simulating natural materials and natural phenomena. For example, it is now common to display realistic images having textures resembling marble, wood, or stone. Likewise, computer researchers and scientists have successfully simulated natural phenomena such as fog, waves, fire, and clouds for display on a computer screen.

Texturing methods vary the point-to-point surface properties of an object to give the appearance of detail that is not actually present in the geometry. A "texture"—sometimes referred to as a "pattern" or "wallpaper"—is simply an image that is used as surface covering for objects or shapes created by a graphics program running on a computer. Textures come in many varieties. Examples include bump mapping, which simulate the appearance of surface bumps without actually modifying the geometry of the object; light maps which give the appearance of smooth diffuse lighting; displacement mapping, in which textures are used to move the surface; and solid textures that give consistent textures of all surfaces of an object regardless of distortions of the surface parameter space.

A texture may be explicitly specified by storing all the complex details of the scene or sequence in a bit-map that contains the value of each pixel in the image. This approach obviously requires a large amount of storage space within the computer; but is it well suited for certain representations, such as a reproduction of a famous painting. Alternatively, all of the details of a given texture may be abstracted into a mathematical function or algorithm (i.e., a procedure) that is used to define pixel values. A procedural technique is defined as a code segment or algorithm that specifies some characteristic of computer generated model or effect. A procedural texture, therefore, is an image initially described—not by the pixel values—but by the operation or formula, which may include a pseudo random element, used to create the pixel values.

Procedural textures offer certain advantages over bit-mapped textures. For instance, the storage requirements of a procedural texture are generally independent of the number of pixels. That is, a procedural texture can be stored in a storage space that is several orders of magnitude less than the space required to store a corresponding bit-mapped representation. Procedural textures also provide the power of parametric control (sometimes referred to as database amplification) allowing the user to create a variety of textures that can be evaluated to any desired resolution. Procedural techniques further offer the designer the flexibility of creating completely abstract or purely artistic effects that lack resemblance to natural objects. Techniques for building procedural textures are described in "Texturing and Modeling", Second Edition, (Chapter 2) Ebert et al., Academic Press, London (1998). Various methods of using procedural textures in graphics rendering systems are disclosed in U.S. Pat. Nos.: 5,956,043, 5,949,428, 5,852,443, 5,808,617, and 5,481,669.

Current methods and systems primarily use fixed-sized, pixel-based images for textures. Few rendering applications utilize procedural textures. For instance, rendering applications and plug-ins that are designed for Internet viewing of models usually transmit compressed images. This places significant demands on the bandwidth of the data communications medium. A typical Joint Photographic Expert Group (JPEG) compressed image with dimensions of 512×512 pixels, for example, requires about 75K bytes. A procedural texture of the same image might only require 3K bytes. Therefore, what is needed is a method and apparatus capable of taking advantage of the benefits offered by procedural textures, with backward compatibility in existing three-dimensional (3D) authoring and rendering applications that rely on traditional pixel-based images for textures.

SUMMARY OF THE INVENTION

The present invention covers an apparatus and method of providing textured surfaces for computer-generated images. In accordance with one embodiment of the invented method, a procedural description corresponding to a bit-map representation of a texture is embedded in a hybrid file module that also includes the bit-map representation. The hybrid file module is transmitted to a player over a data communications medium. The procedural description can be extracted from the hybrid and transmitted instead of the whole hybrid file. On the receiving end, the hybrid file is reconstructed by generating a bit-map from the procedural description. Once received, the procedural description is extracted from the hybrid file module. Following extraction, the procedural description is then used to render the texture. Since the hybrid file is also a valid image file, systems not procedural texture aware can simply use the bit-map.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

A graphics rendering system and method of providing textured surfaces is described. In the following description, numerous specific details are set forth, such as specific system configurations, image sizes, file structures, etc., in order to provide a thorough understanding of the invention. It will be apparent, however, to one skilled in the art, that these specific details may not be needed to practice the present invention.

Figure 1:
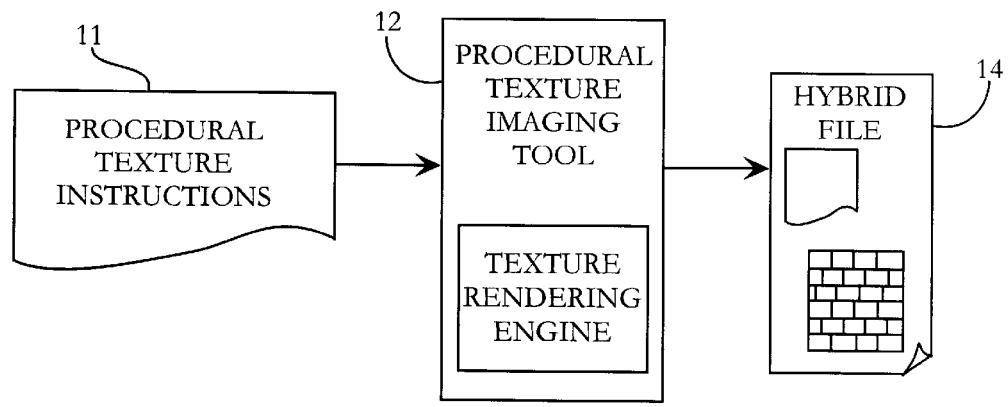
FIG. 1 illustrates rendering a texture image from procedural instructions and storage in a hybrid file in accordance with one embodiment of the present invention.

FIG. 1 is a conceptual diagram illustrating the basic concept of creating hybrid procedural/pixel based textures in accordance with the present invention. As shown in FIG. 1, a set of procedural texture instructions 11 are provided to a procedural texture-imaging tool 12, which itself may include a texture-rendering engine. A texture image is rendered in from the procedural instructions by the procedural texture-imaging tool 12 and stored in a hybrid file 14. Procedural texture-imaging tool 12 comprises a processor, or any other similar graphics device capable of rendering a texture image from procedural instructions. The procedural texture represents an image initially described by the operations used to create the pixel values. For purposes of this discussion, a particular procedural texture may be described by a set of instructions, the form of which could be binary code, compiled Java™ byte-codes, or compressed text listing in a computer language such as Java™, C, or C++. In any case, it is the instructions, and not the pixel values, which are loaded into imaging tool 12.

The host application software running on imaging tool 12 passes the texture instructions 11 to the texture-rendering engine along with a desired resolution. The texture-rendering engine takes the instructions and constructs the desired image at the desired resolution. The texture-rendering engine also creates hybrid file 14. A bit map and a procedural texture of the texture image is written in hybrid file 14, which may reside in any available memory space. The memory space for storing hybrid file 14 may comprise a recording disk, a video card memory, host AGP memory accessible to the video hardware, or other conventional memory.

Hybrid file 14 comprises a pixel/bit-mapped representation of the texture image along with a procedural description (i.e., a procedural texture) corresponding to a bit-map representation. Thus, the hybrid file combines pixel bit textures with procedural textures. In one implementation, the procedural texture instructions are hidden in a specially marked field—e.g., in a comment field or in the header—of the regular pixel-based texture. This allows hybrid file 14 to be used by the author or developer throughout the development process. It also permits the system server a degree of flexibility regarding the type of transmission sent to various players. This aspect of the present invention will be described more detail shortly.

In one embodiment, hybrid file 14 has a standard file structure, such as a standard JPEG file structure. By implementing the hybrid file with a standard structure, and by including both the procedural textures and a representative bit map at some size, hybrid file 14 can be handled by a variety of graphics tools. Some of these tools may require bitmap representations, whereas others may require procedures.

The invented method of creating hybrid files offers considerable benefits over current methods of providing textures. First, systems configured to be aware of hybrid texture files can operate using significantly less communications bandwidth. For example, the hybrid file permits a server to send either a conventional bitmap representation of the texture image or a procedural texture, which can download in a fast, efficient manner. In the case where a procedural texture is sent by a server over, e.g., the Internet, the receiving processor simply re-computes the texture, as opposed to placing the burden on the bandwidth channel to send all the pixels bits.

Second, the method of the present invention is backward compatible with current three-dimensional authoring and rendering applications. This means that the section of the hybrid file that includes the procedural texture will simply be ignored by software that does not recognize this special encoding. In other words, since the hybrid file contains both the bitmap of the texture and an embedded, compact description of that bitmap, software that is incapable of recognizing the procedural texture will simply utilize the pixel-based texture image.

On the other hand, software programs capable of recognizing procedural textures can advantageously generate textures at any desired resolution. The reason why is because procedural textures are resolution independent. Additionally, the procedural textures are not bandwidth limited, as is ordinarily the case with pixel-based textures. Furthermore, the best representation for particular situation can be chosen throughout the entire flow of the texture image—from design process, through distribution, all the way to the rendering engine.

For example, an author may conceive a texture for a three-dimensional object and generate a pixel bitmap of that texture. A hybrid file containing the bitmap and the procedural texture can then be published on a website, with the hypertext markup language (html) file written in such a way that if procedural options are available in the browser, the procedural texture is simply loaded. If not, the browser loads the entire bitmap representation of the texture. The browser may also signal the website server to simply send the procedural instructions over the data communications link, allowing the host processor to perform the calculations necessary to reconstruct the texture image locally.

Figure 2:
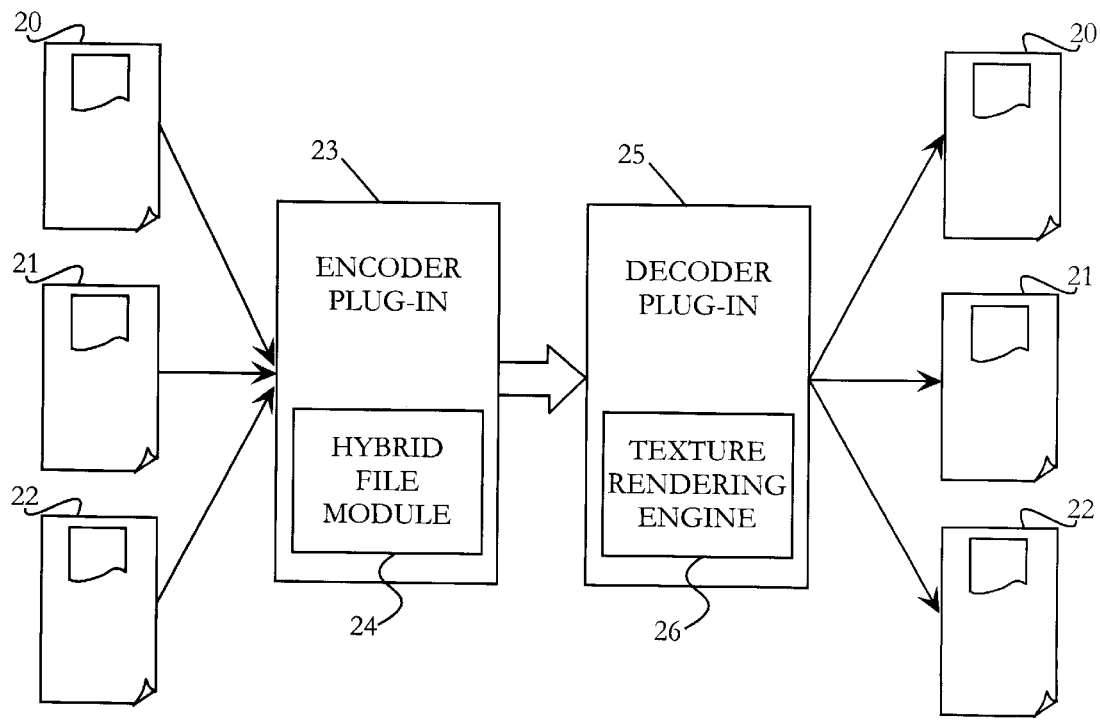
FIG. 2 shows a system for transmission of hybrid files over a data communications medium in accordance with another embodiment of the present invention.

FIG. 2 is a basic diagram that illustrates how procedural instructions may be extracted from hybrid files and transmitted over the Internet. In this example, an encoder plug-in 23 combines the procedural texture instructions from hybrid files 20, 21 and 22 into hybrid file module 24. In this example, encoder 23 resides on a server of a website. The decoder plug-in 25 resides on a player at the receiving-end of the transmission. In this case, encoder 23 just sends the compact procedural textures across the Internet to decoder 25. A texture-rendering engine 26 may be utilized to reconstruct hybrid files 20–22. Practitioners in the art will appreciate that the embodiment illustrated in FIG. 2 is useful for high-end games and simulations that use many textures and cannot keep them all in memory simultaneously. The present invention allows the developer to store only the texture instructions in memory and create the texture "on-demand".

Figure 3:
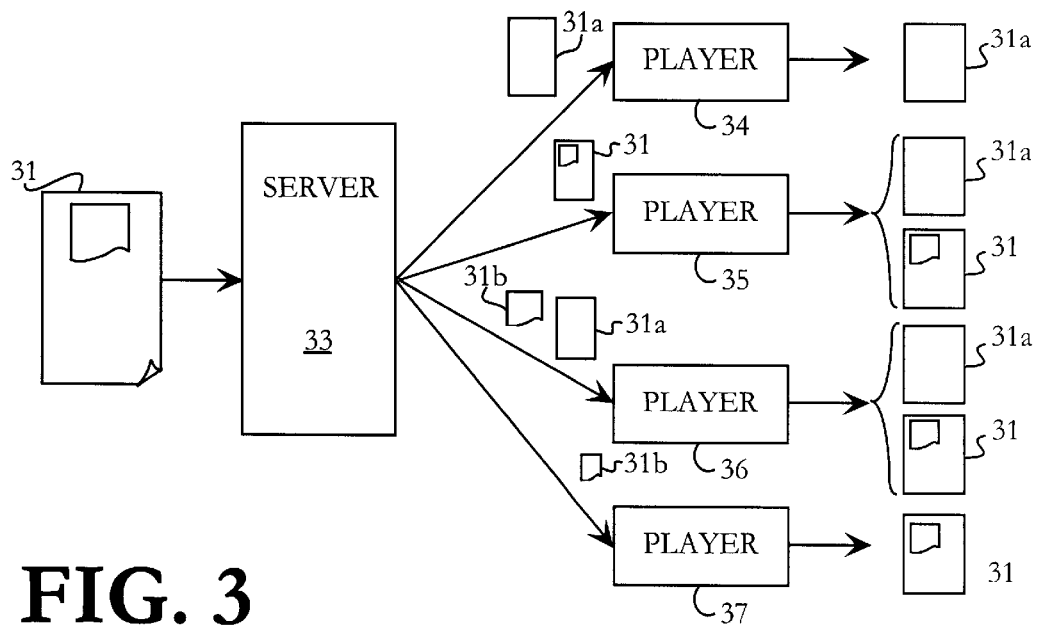
FIG. 3 illustrates a system configured in accordance with yet another embodiment of the present invention.

FIG. 3 illustrates a system configured in accordance with yet another embodiment of the present invention. In this embodiment, a hybrid document 31 is provided to a server 33, which represents the encoding device that transmits textured images to a variety of different decoding devices, denoted as players 34–37. Note that in FIG. 3 the bitmap representation of the texture contained in hybrid document 31 is shown as element 31a. The procedural texture embedded in document 31 is represented by element 31b. As can be seen, either the bitmap representation 31a, the procedural texture 31b, or both are transmitted across the communications medium, depending upon the capabilities of the receiving player.

Player 34 is a traditional player that is limited to receiving bitmap data of the texture. In this case, server 33 transmits just the bitmap representation 31a of the texture. The texture-rendering engine associated with player 34 produces the texture image on an ordinary graphics device.

Player 35 is an enhanced player that is capable of receiving hybrid file 31 and either extracting the procedural texture 31b or utilizing the bitmap representation 31a. It should be appreciated that no bandwidth saving is achieved in this scenario because the entire hybrid file 31 is transmitted across the medium. However, the enhancement of player 35 permits it to either produce the texture image from the bitmap representation or reconstruct the texture at any desired resolution using the procedural texture.

Player 36 in FIG. 3 represents an enhanced player with authoring support. This allows player 36 to recognize attributes included in the associated html file of document 31 on server 33. In other words, either the procedural texture 31b or the entire bitmap representation 31a is transmitted from server 33 to player 36, depending on how the document was authored.

It should be understood that in each of the foregoing examples involving players 34–36, the interaction is entirely one-way: from the server to the player. In the example of player 37, however, the interaction between the server and player is two-way. That is, player 37 is an enhanced player with server communications capability, so it can to indicate to server 33 that it is capable of receiving procedural textures when its download request is made. No authoring support is therefore required with player 37. In this case, server 33 sends just the procedural texture 31b, and player 37 remotely reconstructs hybrid document file 31.

Figure 4:
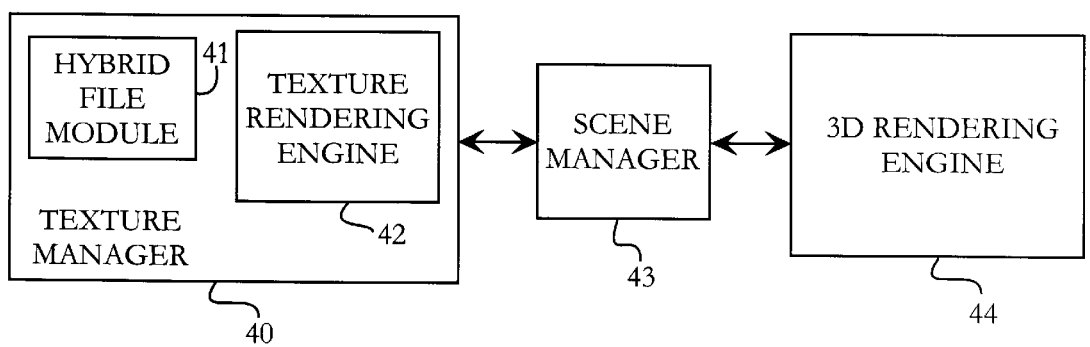
FIG. 4 is a generalized block diagram of a procedural-texture enhanced rendering application according to the present invention.

FIG. 4 is a generalized block diagram of a procedural-texture enhanced rendering application according to the present invention. It is appreciated that each of the elements illustrated in FIG. 4 may be implemented in a computer processor. According to the application of FIG. 4, a three-dimensional (3D) rendering engine 44 is utilized to draw a scene on a graphics display device. A three-dimensional scene manager 43 requests the texture for the image from texture manager 40. Texture manager 40 includes hybrid file module 41 and texture rendering engine 42. Hybrid file module 41 contains the procedural textures and corresponding bitmap representations for a variety of textures. Module 41 may be input to the processor from a communications network such as the Internet, from another file system, or any one of a number of different types of storage devices.

Texture manager 40 extracts the procedural portion of hybrid file module 41 and employs texture-rendering engine 42 to service the request from scene manager 43, generating the texture at whatever resolution is specified in the request. This texture information is then provided to 3D rendering engine 44, which operates to graphically produce the scene on a display device. In one implementation, 3D rendering engine 44 may comprise standard code associated with the system graphics card.

We claim:

1. A method of providing textured surfaces for computer-generated images, comprising:
   embedding a procedural description corresponding to a bitmap representation of a texture in a hybrid file module that also includes the bitmap representation, the procedural description being hidden in a field of the hybrid file;
   transmitting the hybrid file module to a player over a data communications medium;
   extracting the procedural description from the hybrid file module; and
   rendering the texture using the procedural description.

2. The method according to claim 1, wherein the procedural description comprises a set of procedural instructions for generating the texture at any level of resolution.

3. The method according to claim 1, wherein the hybrid file module comprises a standard file structure.

4. The method according to claim 1, wherein the standard file structure is a JPEG file structure.

5. The method according to claim 1, further comprising:
   creating the procedural description corresponding to the bit-map representation.

6. The method according to claim 1, wherein the data communications medium comprises the Internet.

7. The method according to claim 1, wherein the data communications medium comprises a cellular telephone link.

8. The method according to claim 1, wherein the data communications medium comprises a low bandwidth data link.

9. The method according to claim 1, further comprising:
   scaling the texture following extraction.

10. The method according to claim 1, wherein the field is a comment field.

11. The method according to claim 1, wherein the field is a header field.

12. A computer-readable storage medium having a configuration that represents data and instructions that cause a processor to:
    extract procedural instructions embedded in a hybrid file transmitted to the processor over a data communications medium, the procedural instructions corresponding to a bitmap representation of a texture and being hidden in a field of the hybrid file, the hybrid file also including the bitmap representation; and
    execute the procedural instructions to render the texture.

13. The computer-readable storage medium of claim 12, wherein the computer-readable storage medium is further configured to cause the processor receive the hybrid file from a server over the data communications medium.

14. The computer-readable storage medium of claim 13, wherein the data communications medium comprises the Internet.

15. The computer-readable storage medium of claim 12, wherein the hybrid file comprises a standard JPEG file structure.

16. The computer-readable storage medium of claim 12, wherein the computer-readable storage medium is further configured to cause the processor to scale the texture to a specified level of resolution.

17. The computer-readable storage medium of claim 12, wherein the field is a comment field.

18. The computer-readable storage medium of claim 12, wherein the field is a header field.

19. A system for transmission of textured images comprising:
    a data communications medium;
    an encoding device to extract a procedural texture from a hybrid file that also contains a bitmap representation of a texture, the encoder being coupled to the data communications medium to transmit the procedural texture thereon, the procedural texture being hidden in a field of the hybrid file; and
    a decoding device coupled to the data communications medium to receive the procedural texture and render the bitmap representation of the texture at a specified resolution.

20. The system of claim 19, wherein the data communications medium comprises the Internet.

21. The system of claim 19, wherein the encoding device comprises a server.

22. The system of claim 19, wherein the decoding device comprises a player having a texture rendering engine.

23. The system of claim 19, wherein the field is a comment field.

24. The system of claim 19, wherein the field is a header field.

25. An apparatus for rendering a texture comprising:
- a texture manager that includes a hybrid file and a texture-rendering engine, the hybrid file containing both a procedural texture and a corresponding bitmap of the texture, the procedural texture being hidden in a field of the hybrid file;
- a three-dimensional rendering engine to graphically produce a scene; and
- a scene manager to request the texture for the scene at a specified resolution from the texture manager; the texture manager extracting the procedural texture from the hybrid file and employing the texture-rendering engine to service the request by generating the texture at the specified resolution for use by the three-dimensional rendering engine.

26. The apparatus of claim 25, wherein the field is a comment field.

27. The apparatus of claim 25, wherein the field is a header field.

* * * * *